(12) United States Patent
Tuttle et al.

(10) Patent No.: US 6,551,086 B1
(45) Date of Patent: Apr. 22, 2003

(54) TIRE MOLD REINFORCEMENT

(75) Inventors: James Robert Tuttle, Hudson; Stanley Anthony Gwizdak, Jr., Sardinia; Roger Alden Fleming, Stow; James Glen Moore, Jr., Mogadore; Gary Scott Christie, Massillon; Clarence Maxon Gainer, Clinton; Bernard Byron Jacobs, Akron; Stephanie Anne Lee, Hartville; Harold Eugene Marlott, Canton; Frederick Forbes Vannan, Jr., Clinton, all of OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 09/445,730

(22) PCT Filed: Jun. 23, 1997

(86) PCT No.: PCT/US97/10703

§ 371 (c)(1),
(2), (4) Date: Dec. 9, 1999

(87) PCT Pub. No.: WO98/58786

PCT Pub. Date: Dec. 30, 1998

(51) Int. Cl.[7] .......................... B29C 33/38; B29C 33/42

(52) U.S. Cl. .......................... 425/46; 264/219; 425/117; 425/175

(58) Field of Search .......................... 425/28.1, 46, 117, 425/175; 264/219

(56) References Cited

U.S. PATENT DOCUMENTS

| | | | |
|---|---|---|---|
| 2,275,582 A | * | 3/1942 | Bull |
| 2,765,508 A | | 10/1956 | Spitler .......................... 164/10 |
| 2,848,910 A | | 8/1958 | Bastian ...................... 76/107.1 |
| 4,858,881 A | | 8/1989 | Alloway ...................... 249/135 |
| 5,449,483 A | | 9/1995 | Greenwood et al. ........ 264/155 |
| 6,241,071 B1 | * | 6/2001 | Yamashita et al. |

* cited by examiner

*Primary Examiner*—James P. Mackey
(74) *Attorney, Agent, or Firm*—Frederick K. Lacher, Esq.; Bruce S. Hendricks, Esq.; The Goodyear Tire & Rubber Co.

(57) ABSTRACT

Making a tire mold having a plurality of complete tire mold segments (20) of epoxy resin mold material formed in the chambers (18) of segmental shoes (10) and having reinforced stand alone ribs (56) formed in recesses in the tread models mounted in the shoes. The shoes (10) and models (50) are reusable and have standard shoe split diameters and chord lengths to reduce the time necessary to make the molds. The models (50) are of resilient material and are also reusable.

16 Claims, 7 Drawing Sheets

TIRE MOLD REINFORCEMENT

TECHNICAL FIELD

This invention relates to methods and mold constructions for making molds of plastics, such as epoxy resin. These molds may be made by pouring uncured, liquid plastic epoxy resin over models in segmented shoes. The present invention is especially directed to the forming of epoxy resin molds for molding tires which have recesses in the tread surface which are formed by stand alone ribs in the surfaces of the molds. The segmented shoes are reusable and may be prefabricated with standard shoe split diameters and chord lengths to reduce the time necessary to make subsequent molds. Alignment and sealing of the shoe parts is provided.

BACKGROUND ART

As shown in U.S. Pat. No. 4,858,881, it has been proposed to make partial tire molds of epoxy or other resin to repair tire sidewalls. It has also been proposed to reinforce plastic articles with glass fibers, as shown in U.S. Pat. No. 4,692,291. U.S. Pat. No. 5,449,483 uses modular shoe containers for making metal shells with a resin backing.

The transfer of metal blades from slits in a matrix of rubber to a mold shell is described in U.S. Pat. No. 2,275,582. The matrix is covered by an electro-formed metal shell which bonds to the blades so that upon removal of the matrix the blades become part of the metal mold shell. The mold shell must then be machined to become part of a tire mold.

DISCLOSURE OF INVENTION

In accordance with the method of this invention, a model of a segment of a tire having a tread configuration with recesses such as grooves, slots and slits in the model surface is mounted in a shoe having a chamber for receiving a plastic, such as uncured, liquid epoxy resin, to form a complete segment of the tire mold. Before filling the chamber with the uncured epoxy resin, the model is sprayed with a grease type spray release agent which does not react with the epoxy resin to retard its curing.

In one embodiment of this invention a mixture of fiberglass and epoxy is sprayed on the surface of the model and into the recesses in the model surface to provide reinforced stand alone ribs in the tread molding surface of the epoxy resin mold after curing and removal of the mold from the model. In another embodiment, the mixture of uncured epoxy resin and fiberglass is formed in a semi-liquid putty-like consistency, and instead of spraying, this material is packed against the surface of the model to fill the recesses in the model surface. After the recesses are filled by packing the mixture of epoxy resin and fiberglass and allowing it to cure the chamber in the shoe is completely filled by pouring uncured liquid epoxy resin mold material into the chamber of the shoe to form a complete mold segment. This liquid epoxy resin mold material is then cured.

In another embodiment, a slurry of liquid epoxy resin and fiberglass is poured directly over the model and the chamber filled after which pressure is applied to force the slurry into the recesses in the model surface and to form stand-alone ribs in the mold surface.

In a further embodiment, single or laminated metal blades are inserted in the slits of the model after the model has been sprayed with a release agent. The blades may be glued to the model with an appropriate adhesive for bonding metal to elastomeric materials. The model is then mounted in a shoe container and filled with a liquid epoxy resin mold material which bonds to the surface of the blades. The epoxy resin mold material is cured and then cooled. When the model is removed, the solidified epoxy resin mold material contained in the shoe is pulled away from the model. The blades remain in the epoxy tread mold and reinforce the ribs and make them capable of withstanding the stress and strain from the tire molding process.

The model is preferably a resilient elastomeric material facilitating insertion of the blades into the slits of the model and removal of the blades from the slits in the model after pouring of the epoxy resin mold material. The model can then be used again to form another tread mold segment.

The process of this invention provides steel or aluminum parts to make the epoxy resin tread mold segment and to hold the segments during tire curing. Parts of different sizes have been needed to make molds of different tire sizes. In order to make the molds quickly, the parts have been prefabricated. In accordance with this invention, the number of different size parts has been reduced by prefabricating them in different sizes using two dimensional standards. One dimensional standard is the mold split diameter which is the diameter at which the sidewall plates meet the tread segments. The other dimensional standard is the chord angle and the sequence of the slide block parts which are used in the mold mechanism.

The shoes of this invention may also be used more than once by providing a U-shaped cavity with radial sides permitting easy removal of the epoxy mold tread segment from the cavity after curing while at the same time the tread segment mold part is secured without requiring lips on the edges. This is accomplished while providing sealing of the shoe cavity and holding the model bracket in alignment with the shoe.

In accordance with one aspect of the invention, there is provided a method of providing reinforced stand-alone ribs in the molding surface of a mold of epoxy resin mold material for molding an article having recesses in the surface comprising:

(a) making a model of elastomeric material having recesses in the surface of the model;

(b) applying a release agent to the surface of the model characterized by;

(c) inserting metal blades in the recesses;

(d) placing the model in a shoe container chamber having the shape of a complete mold part;

(e) filling the shoe container chamber with an epoxy mold material to form a complete mold part;

(f) curing the epoxy mold material in the container while it is cured to form the mold part; and (g) separating the mold part from the model with the metal blades adhering to the mold part and being pulled out of the recesses in the surface of the model.

In accordance with another aspect of this invention, there is provided a method of providing reinforced stand-alone ribs in the surface of a plastic mold for molding an article having recesses in the surface of the article comprising (a) making a model of elastomeric material having recesses in the surface of the article;

(b) applying a release agent to the surface of the model characterized by;

(c) spraying the surface with uncured epoxy resin mold material containing reinforcing material to fill the recesses;

(d) placing the model in a shoe container chamber having the shape of a complete mold part;

(e) filling the shoe container chamber with the uncured epoxy resin mold material to form a complete mold part;

(f) retaining the epoxy resin mold material in the container chamber while it is cured to form the mold part; and (g) separating the mold part from the model with the epoxy resin mold material in the recesses being pulled out of the recesses in the model in the form of stand alone ribs.

In accordance with a further aspect of this invention, there is provided a method of providing reinforced stand alone ribs in the surface of a plastic mold for molding an article having recesses in the surface of the article comprising (a) making a model of elastomeric material having recesses in the surface of the model;

(b) applying a release agent to the surface of the model characterized by;

(c) packing plastic mold material containing reinforcing material against the surface and into the recesses of the model;

(d) placing the model in a shoe container chamber having the shape of a complete mold part;

(e) filling the shoe container with a plastic mold material to form a complete mold part;

(f) retaining the plastic mold material in the container while it is cured; and (g) separating the mold part from the model with the plastic mold material containing the reinforcing material in the recesses being pulled out of the recesses in the model in the form of reinforced stand alone ribs.

In accordance with a still further aspect of the invention there is provided a tire mold comprising:

(a) a plurality of mold segments of epoxy resin mold material;

(b) each of the segments having a radially inner tread molding surface with ribs for molding recesses in the tread surface characterized by;

(c) the tread molding surface having stand alone ribs of a mixture of epoxy mold material and reinforcing material; and (d) each of the mold segments being completely shaped to mold a segment of a tire tread in the tire mold.

In accordance with another aspect of the invention there is provided a complete tire mold comprising:

(a) a plurality of mold segments of epoxy resin mold material;

(b) each of the segments having a radially inner tread molding surface with metal blades adhered to the segment for forming recesses in a tire made by the mold.

(c) a segmental shoe of metal encasing each of the mold segments of epoxy resin material comprising;

(d) radially extending shoe side plates providing a U-shaped cross section in a radial plane containing the axis of the mold whereby after use of the segmental shoe, the epoxy mold material may be removed from the chamber of the segmental shoe of metal so that the shoe may be used again;

DETAILED DESCRIPTION OF THE INVENTION

Figure 1:
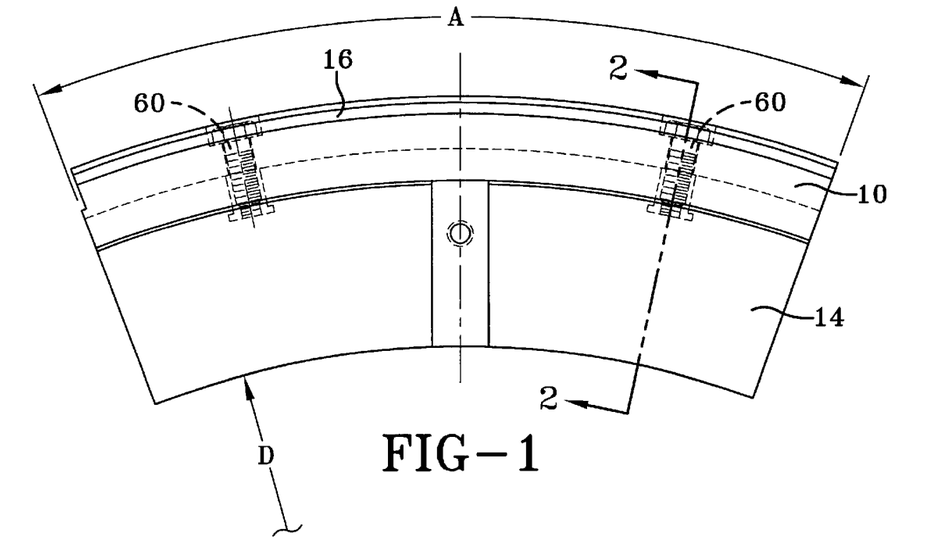
FIG. 1 is a top view of a segmental shoe for a tire mold embodying the invention.
Figure 2:
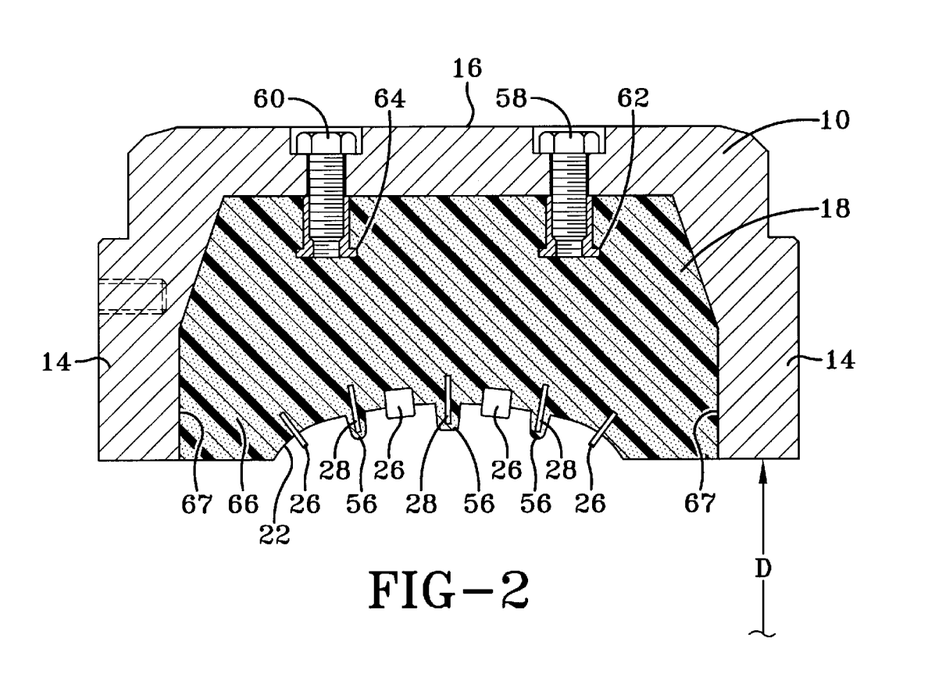
FIG. 2 is a sectional view taken along line 2—2 in FIG. 1.
Figure 3:
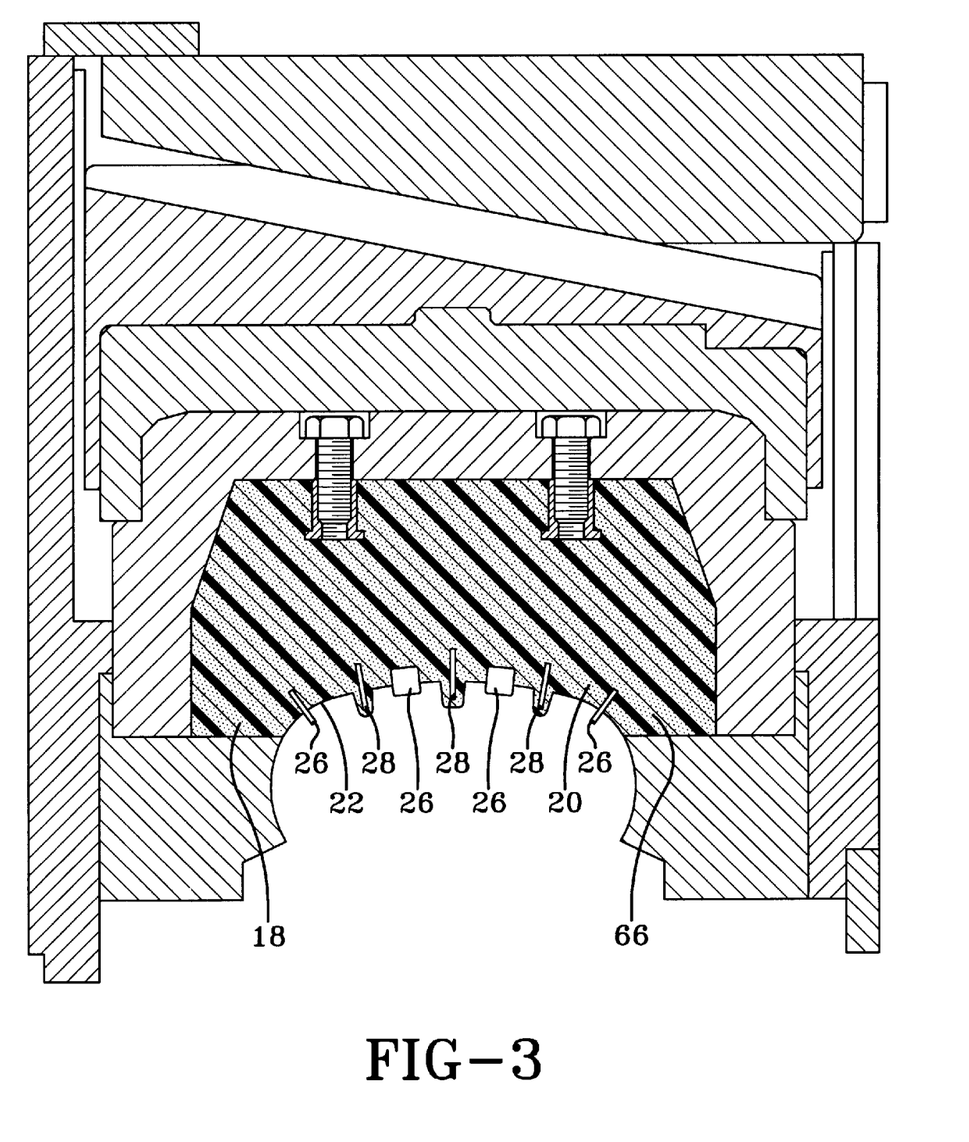
FIG. 3 is a schematic sectional view of part of a tire press with the segmental shoe mounted in the press.
Figure 4:
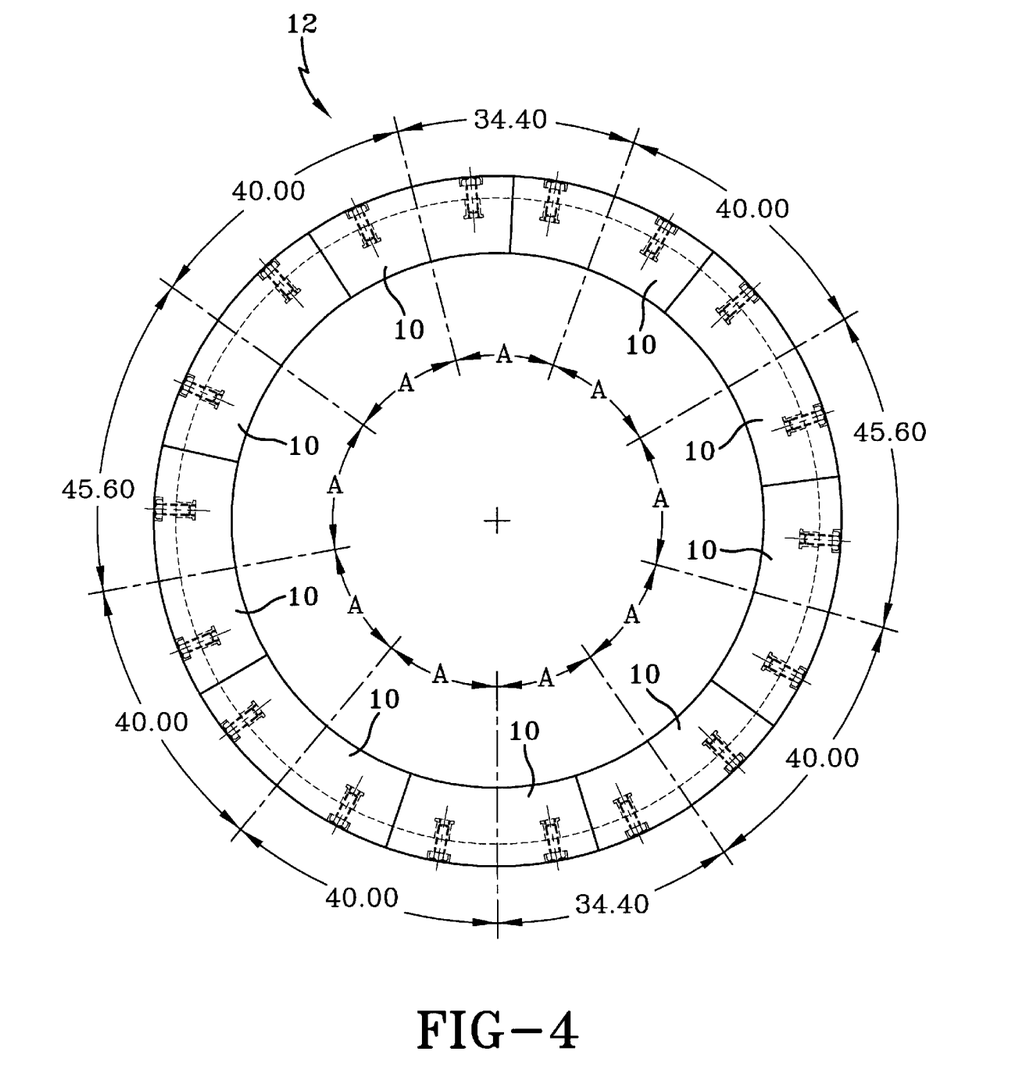
FIG. 4 is a schematic plan view of the segmental shoes in accordance with FIGS. 1 and 2 assembled to form a 360° tread molding surface showing the different cord angles and circumferential lengths of the segments.

Referring to FIGS. 1 and 2, a segmental shoe 10 for a tire mold is shown. This segmental shoe 10 and eight other shoes are assembled in a tread ring 12 as shown in FIG. 4. Each shoe 10 consists of shoe side members 14 connected by an outer tread forming member 16. Inside the segmental shoe 10 is a chamber 18 containing a tread mold segment 20 of epoxy mold material having a tread molding surface 22. The segmental shoe 10 may be mounted in a tire press 24, a part of which is schematically shown in FIG. 3 and is movable radially into and out of a molding position as shown in FIG. 3. Stand alone rib members, such as steel blades 26 and epoxy ribs reinforced by steel strip members 28 extend outwardly from the tread molding surface 22 to provide slits and larger slots in the tire tread.

Segmental shoes 10 of different sizes have been needed to make the tread mold segments 20 for different tire sizes. This has required prefabrication, and accordingly it is desirable that the inventory of segmental shoes be kept to a minimum. As shown in FIGS. 2 and 4, the number of parts has been reduced by prefabricating the shoes in different sizes using two dimensional standards. One dimensional standard is the mold split diameter D. The other dimensional standard is the chord angle A shown in FIGS. 1 and 4. Mold split diameters D which have been found to be desirable for reducing the number of segmental shoes are 19.770 inches (50.216 cm), 20.420 inches (51.87 cm), 21.420 inches (54.41 cm), 21.030 inches (53.42 cm), 22.140 inches (56.24 cm) and 22.840 inches (58.01 cm).

Figure 5:
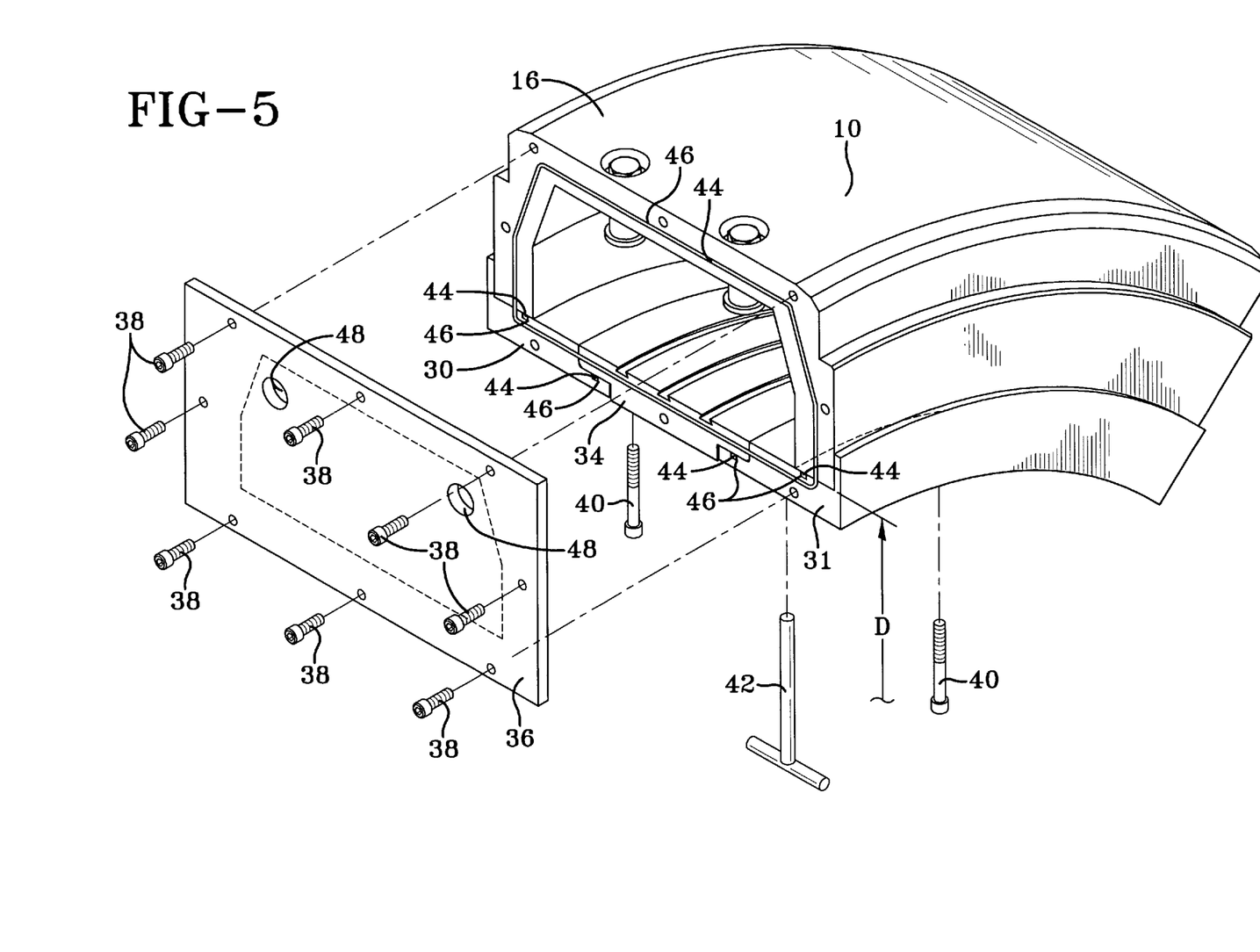
FIG. 5 is a detailed exploded view of one of the segmental shoes shown in FIG. 1.

As shown in FIG. 4, chord angles and the chord sequence which have been found to provide standardized parts and also reduce the tire noise due to sequenced molds are in the following sequence:

34.400 degrees
40.000 degrees
45.600 degrees
40.000 degrees 34.400 degrees
40.000 degrees
45.600 degrees
40.000 degrees
40.000 degrees Referring to FIG. 5, segmental shoe 10, end brackets 30 and 31, center bracket 34 and end plate 36 are shown in an exploded condition. Bolts 38 are provided for threaded engagement with corresponding threaded holes in the segmental shoe 10 and end bracket 30, end bracket 31 and center bracket 34. Bolts 40 are provided for threaded engagement with threaded holes in the end brackets 30 and 31 and the shoe side members 14. Alignment pins 42 extend through holes in the end brackets 30 and 31 into holes in the shoe side members 14. Sealing means, such as O-ring chord material 44 mounted in O-ring grooves 46, provide a seal for the chamber 18 inside the segmental shoe 10. Inlet holes 48 in the end plate 36 are provided for communicating the epoxy or other plastic material in liquid form into the chamber 18.

Figure 6:
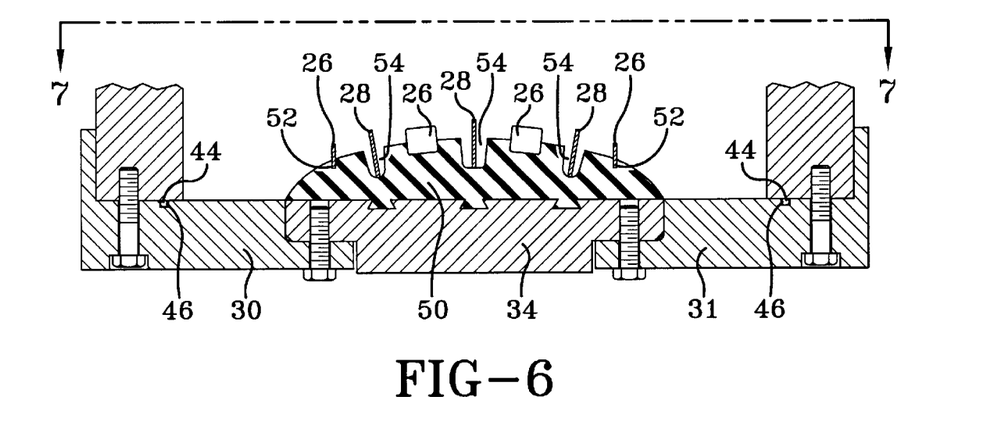
FIG. 6 is a sectional view of the model on the center bracket shown in FIG. 6 taken along line 6—6 in FIG. 7 showing the metal blades and strips positioned in the recesses.
Figure 7:
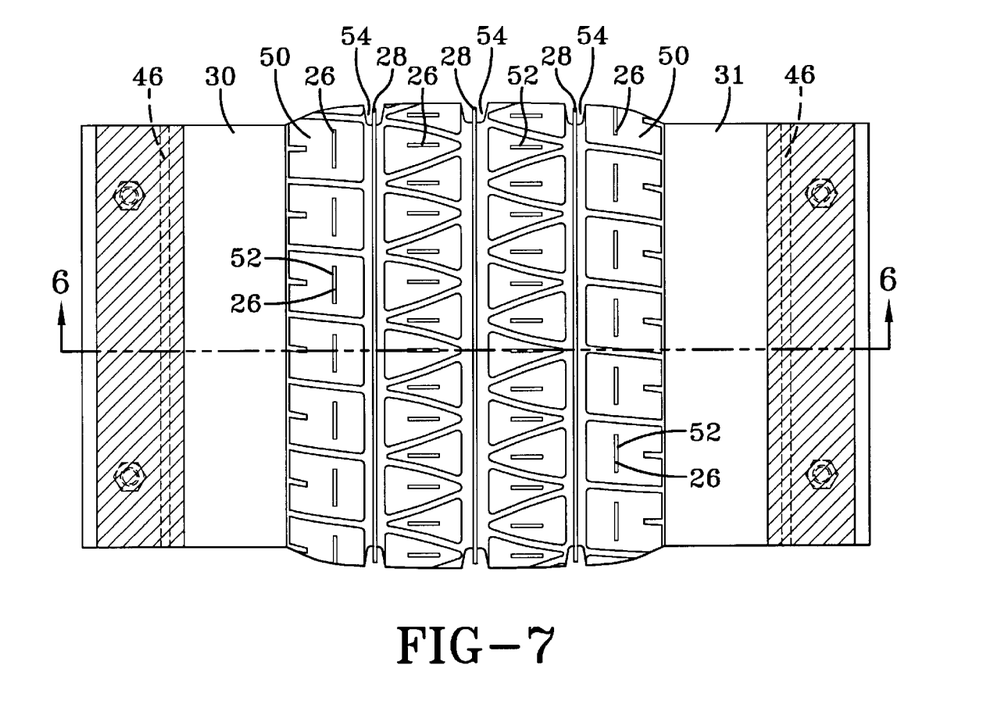
FIG. 7 is a plan view of the model taken along the line 7—7 in FIG. 6.

Referring to FIGS. 6 and 7, fragmentary views of the segmental shoe 10 with a model such as model blank 50 fastened to the center bracket 34 are shown. The model blank 50 may be made in a plaster back set-up mold, in which the shape of the tire crown is formed by sweeping the plaster back. The end brackets 30 and 31 are placed over the center cavity in the plaster back and an elastomer, such as silicone, is poured in the cavity. The end brackets 30 and 31 are removable to provide clearance for carving the model blank at the shoulder. The model blank 50 shown in FIGS. 6 and 7 has a tread carved with recesses, such as slits 52 and wider slots 54, to provide stand alone ribs in the tread molding surface 22 of the mold segment 20.

Referring to FIGS. 2, 3 and 6, the metal blades 26 forming part of the tread molding surface 22 are placed in the slits 52 of the model blank 50. Also the steel strip members 28 are placed in the slots 54 of the model blank prior to assembling the segmental shoe 10. The steel strip members 28 may be glued to the model blank 50 in the slots 54 by a suitable adhesive for bonding metal to elastomers. The segmental shoe chamber 18 is then filled with a plastic, such as epoxy, which may contain aluminum pellets and the epoxy material is permitted to cure. In this embodiment the epoxy tread mold segment 20 is cured at room temperature for 24 hours and then heated to a higher temperature, such as 200° F. (93° C.), 300° F. (149° C.) and 400° F. (205° C.) for four to five hours. The segmented shoe 10 is then disassembled and the tread mold segment shown in FIGS. 2 and 3 is ready for mounting in the tire press 24 as shown in FIG. 3. The steel blades 26 are pulled out of the model blank 50 and the steel blades 26 extend into the stand alone ribs 56 of the tread molding surface 22 as shown in FIG. 2 and are also pulled out of the slots 54 in the model blank 50 with the stand alone ribs 56. The adhesive holds the steel strip members 28 in place during the application of the plastic material and aluminum pellets. Then after curing, the steel strip members 28 may be pulled away from the model blank 50 and any remaining adhesive removed from the steel strip members. The model blank 50 may be used again simply by adding the steel blades 26 and the steel strip members 28.

As shown in FIGS. 1 and 2, bolts 58 and 60, having locking collars 62 and 64, extend through the tread forming member and are imbedded in the epoxy material 66. The side surface 67 of the chamber 18 are preferably parallel so that after use, the bolts 58 and 60 may be released and the epoxy mold 66 removed from the chamber 18 whereupon the metal parts can be used again for making another mold segment.

Figure 8:
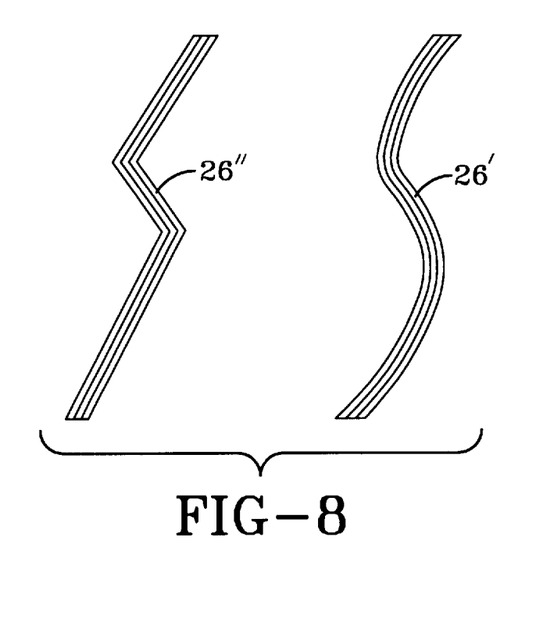
FIG. 8 is an enlarged plan view of two forms of nested multiple blades for inserting in recesses in the model where the recesses are wider than the thickness of a single blade.

Referring to FIG. 8, steel blades 26' and 26" are shown, which are adapted to fill slits 52 or slots 54, having similar shapes. The blades 26' and 26" may be laminated to fill wider slits if desired. It has been found, however, that it is not always necessary to fill the slots 54, but simply to place the steel strip members 28 in the slots where they provide sufficient reinforcement for the epoxy stand alone ribs.

Figure 9:
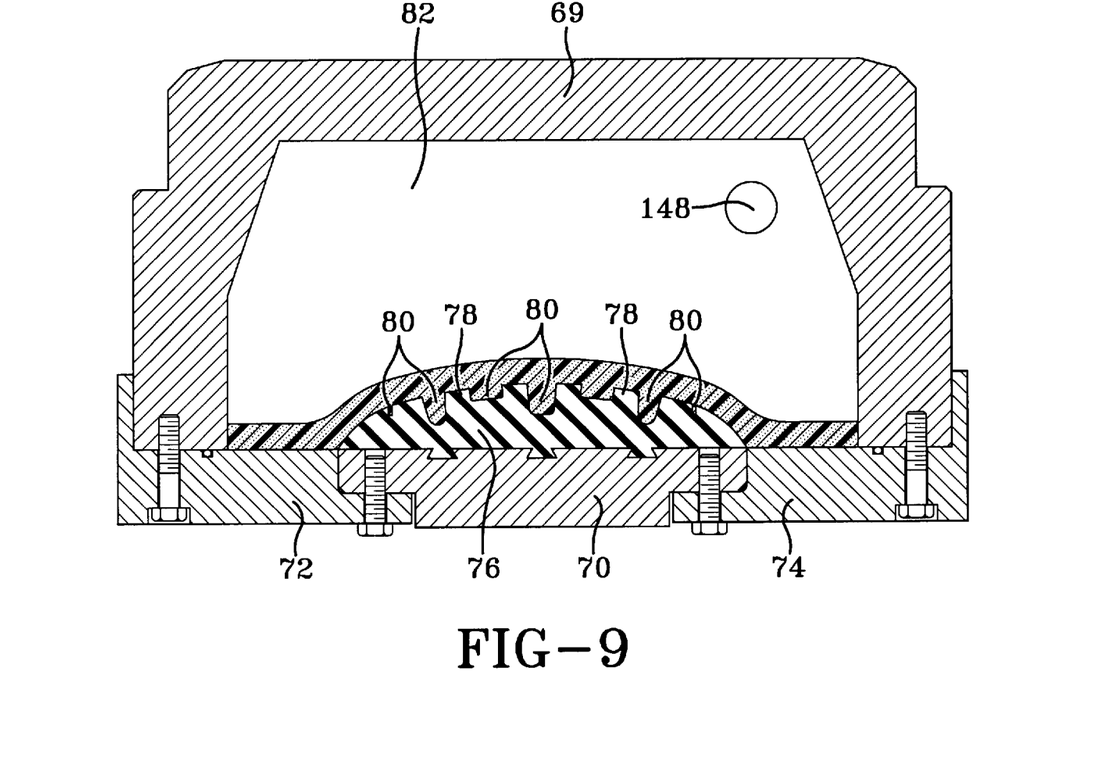
FIG. 9 is a sectional view of the model enclosed in the shoe with the epoxy resin being sprayed under pressure into the recesses in the model surface.

Referring to FIG. 9, a segmental shoe 69 is assembled with a center bracket 70 and end brackets 72 and 74. A model blank 76 is mounted on the center bracket 70, and has a carved tread mold forming surface 78 with recesses 80 to form stand alone ribs. In accordance with this embodiment, an epoxy material containing a reinforcing material, such as chopped fiberglass, is communicated into the chamber 82 of the segmental shoe and sufficient pressure applied to force the reinforced epoxy material into the recesses 80. The epoxy is cured in a manner similar to that set forth hereinabove for the embodiment of FIGS. 1–8, whereupon the model blank 76 is removed and the segmental shoe 68 may be mounted in a tire press.

Figure 10:
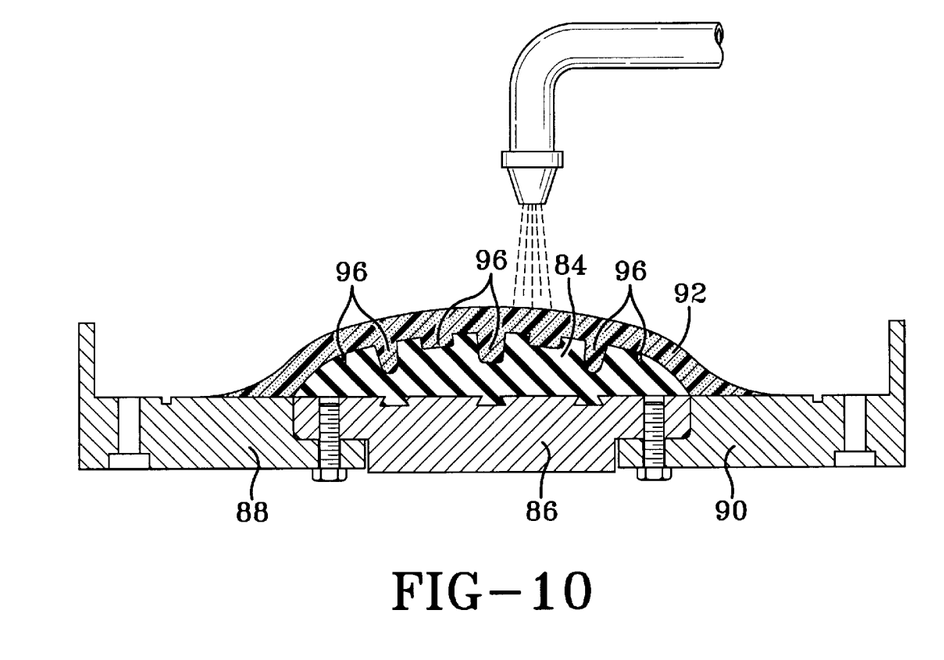
FIG. 10 is a sectional view of the model on the center bracket being sprayed with the epoxy resin to fill the recesses in the mold surface.

Referring to FIG. 10, a model blank 84 is shown mounted on a center bracket 86 and end brackets 88 and 90. In this embodiment, the epoxy mold material 92 reinforced with a suitable material, such as fiberglass, is sprayed on the tread mold forming surface 94 under pressure to fill the recessed 96 in the model blank 84 to provide the stand alone ribs of reinforced epoxy material. After application of the reinforced epoxy material 92 to the tread molding surface 94, the center bracket 86 and end brackets 88 and 90 are mounted in the segmental shoe and the end plates 36 bolted and sealed whereupon the chamber 38 is filled and the tread mold segment completed as described hereinabove for the embodiment shown in FIG. 9.

Figure 11:
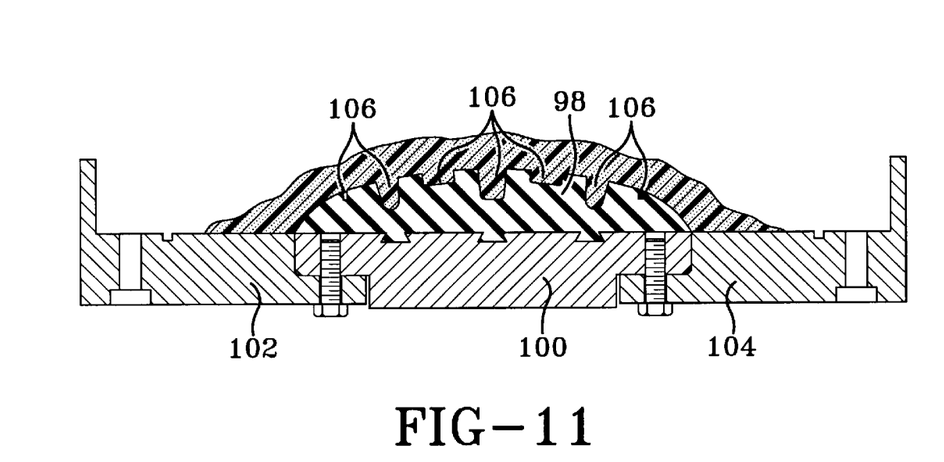
FIG. 11 is a sectional view of the model on the center bracket with the epoxy resin

Referring to FIG. 11, a further modification is shown in which a model blank 98 is mounted on a center bracket 100 and end brackets 102 and 104. The recesses 106 are then filled with epoxy containing reinforcing material, such as chopped fiberglass, by packing the material into the recesses 106. The center bracket 100 and end brackets 102 and 104 are then assembled in the mold segment as described hereinabove for the embodiments of FIGS. 9 and 10 for completing the tread mold segment.

Having thus described the invention it is now claimed:

1. A method of providing reinforced stand alone ribs in the molding surface of a mold of epoxy resin mold material for molding an article having recesses in the surface of the article comprising:
   (a) making a model of elastomeric material having recesses in the surface of said model;
   (b) applying a release agent to the surface of said model, characterized by;
   (c) inserting metal blades in said recesses;
   (d) placing said model in a shoe container chamber having the shape of a complete mold part;
   (e) filling said shoe container with an uncured epoxy resin mold material to form a complete mold part;
   (f) curing said epoxy mold material in said shoe container to form said mold part; and
   (g) separating said mold part from said model with said metal blades adhering to said mold part and being pulled out of said recesses in said surface of said model.

2. The method of claim 1 further characterized by said recesses being non-linear and said metal blades being shaped to conform with the non-linear shape of said recesses.

3. The method of claim 2 further characterized by said recesses being curved and said blades being curved to fit into said recesses.

4. The method of claim 1 further characterized by adhering said metal blades to said model with an adhesive to hold them in place during filling of said shoe container and said adhesive permitting pulling of said metal blades out of said recesses during separation of said mold part from said model.

5. The method of claim 1 further characterized by said metal blades comprising laminated sheets of metal having a laminated thickness equal to the width of said recesses.

6. A method of providing reinforced stand alone ribs in the surface of a mold of epoxy mold material for molding an article having recesses in the surface of the article comprising:

(a) making a model of elastomeric material having recesses in the surface of said model;

(b) applying a release agent to the surface of said model characterized by;

(c) spraying said surface of said model with epoxy mold material containing reinforcing material to fill said recesses;

(d) placing said model in a shoe container chamber having the shape of a complete mold part;

(e) filling said shoe container with epoxy mold material to form a complete mold part;

(f) retaining said epoxy mold material in said container while it is cured to form said mold part; and (g) separating said mold part from said model with said epoxy mold material in said recesses being pulled out of said recesses in said model in the form of reinforced stand alone ribs.

7. A method of providing reinforced stand alone ribs in the surface of a plastic mold for molding an article having recesses in the surface of the article comprising:

(a) making a model of elastomeric material having recesses in the surface of said model;

(b) applying a release agent to the surface of said model characterized by;

(c) packing plastic mold material containing reinforcing material against said surface and into said recesses of said model;

(d) placing said model in a shoe container chamber having the shape of a complete mold part;

(e) filling said shoe container with a plastic mold material to form a complete mold part;

(f) curing said plastic mold material in said container while it is cured; and (g) separating said mold part from said model with said plastic mold material containing said reinforcing material in said recesses being pulled out of said recesses in said model in the form of reinforced stand alone ribs.

8. A method of providing reinforced stand alone ribs in the surface of a mold of epoxy mold material for molding an article having recesses in the surface of the article comprising:

(a) making a model of elastomeric material having recesses in the surface of said model;

(b) placing said model in a shoe container;

(c) applying a release agent to the surface of said model characterized by;

(d) filling said shoe container with epoxy mold material containing reinforcing material to form a complete mold part;

(e) applying pressure to said epoxy mold material in said shoe container to fill said recesses with said epoxy mold material and said reinforcing material;

(f) retaining said epoxy mold material in said container while it is cured; and (g) separating said mold part from said model with said epoxy mold material containing said reinforcing material in said recesses being pulled out of said recesses in said model in the form of reinforced stand alone ribs.

9. A tire mold comprising:

(a) a plurality of mold segments of epoxy resin mold material;

(b) each of said segments having a radially inner tread molding surface with ribs for molding recesses in said tread surface characterized by;

(c) said tread molding surface having recess forming stand alone ribs of a mixture of epoxy mold material and reinforcing material; and (d) each of said mold segments being completely shaped to mold a segment of a tire tread in said tire mold.

10. A tire mold in accordance with claim 9 further characterized by said recess forming ribs for each segment being reinforced by metal strip members adhered to said segment and said ribs being pulled from a model forming one side of a shoe chamber for molding a complete mold segment.

11. The tire mold of claim 10 further characterized by at least one of said recess forming ribs being reinforced by multiple nested metal blades adhered to said segment.

12. The tire mold of claim 9 further characterized by each of said recess forming ribs being reinforced by a metal strip member which is bent to fill a curved recess in said tire tread.

13. A segmental shoe for molding a tire mold with a plurality of other segmental shoes characterized by:

(a) a center bracket member and two end brackets for supporting a segment of a tire tread model;

(b) spaced apart radially extending side members;

(c) a radially outward tread forming member connecting said side members;

(d) end plate members fastened to said side members, said end brackets and said center bracket member to enclose a tread chamber;

(e) an inlet in one of said side members for communicating a slurry of plastic material from a source outside of said shoe to said chamber to form a tread mold segment within said side members, characterized by said side members having substantially parallel surfaces so that upon removal of said center bracket and said end brackets said shoe may be mounted in a tire mold for application of said tread to a tire carcass.

14. A segmental shoe in accordance with claim 13 further characterized by said side members being held in alignment with said end brackets by alignment pins extending through each of said end brackets and said side members.

15. A segmental shoe in accordance with claim 13 further characterized by sealing means disposed between said end plates, said end brackets and said center bracket.

16. A segmental shoe in accordance with claim 15 further characterized by said sealing means comprising O-ring cord material in an O-ring groove in said end plates and said end brackets.

* * * * *

UNITED STATES PATENT AND TRADEMARK OFFICE
CERTIFICATE OF CORRECTION

PATENT NO. : 6,551,086 B1
DATED : April 22, 2003
INVENTOR(S) : James R. Tuttle et al.

It is certified that error appears in the above-identified patent and that said Letters Patent is hereby corrected as shown below:

Column 5,
Line 64, before numeral "67", substitute -- surfaces -- for "surface".

Signed and Sealed this

Sixteenth Day of September, 2003

JAMES E. ROGAN
*Director of the United States Patent and Trademark Office*